United States Patent
Tong

(10) Patent No.: US 6,628,020 B1
(45) Date of Patent: Sep. 30, 2003

(54) HEAT TRANSFER ENHANCEMENT OF VENTILATION GROOVES OF ROTOR END WINDINGS IN DYNAMOELECTRIC MACHINES

(75) Inventor: Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/063,874

(22) Filed: May 21, 2002

(51) Int. Cl.[7] ............... H02K 9/00; H02K 3/22; H02K 1/20

(52) U.S. Cl. ............... 310/61; 310/61; 310/58; 310/65; 310/60 A

(58) Field of Search ............... 310/61, 58, 59, 310/60 A, 214, 215, 65; H02K 3/22

(56) References Cited

U.S. PATENT DOCUMENTS

| | | | |
|---|---|---|---|
| 2,778,959 A | | 1/1957 | Kilner |
| 4,709,177 A | * | 11/1987 | Kaminski ............... 310/59 |
| 5,281,877 A | | 1/1994 | Kazmierczak et al. |
| 5,644,170 A | | 7/1997 | Bynum et al. |
| 5,644,179 A | | 7/1997 | Staub et al. |
| 6,204,580 B1 | * | 3/2001 | Kazmierczak ............... 310/52 |
| 6,252,318 B1 | * | 6/2001 | Kazmierczak ............... 310/61 |
| 6,339,268 B1 | | 1/2002 | Kaminski et al. |

* cited by examiner

*Primary Examiner*—Dang D. Le
*Assistant Examiner*—Iraj A. Mohandesi
(74) *Attorney, Agent, or Firm*—Nixon & Vanderhye PC

(57) ABSTRACT

A technique for enhancing heat transfer ventilation grooves is provided which allows the cooling groove dimensions to be minimizes while satisfying endwinding cooling requirements. Groove dimension may be minimized by including surface manifestations and/or selecting a non-linear groove configuration or shape to enhance heat transfer.

26 Claims, 4 Drawing Sheets

HEAT TRANSFER ENHANCEMENT OF VENTILATION GROOVES OF ROTOR END WINDINGS IN DYNAMOELECTRIC MACHINES

BACKGROUND OF INVENTION

This invention relates generally to the rotor windings of a dynamoelectric machine, and more particularly, to rotor and rotor end winding cooling in machines with concentric rotor windings.

The rotors in large gas cooled dynamo-electric machines have a rotor body which is typically made from a machined high strength solid iron forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges which bear against machined dovetail surfaces in each slot. The regions of the rotor winding coils which extend beyond the ends of the main rotor body are called "end windings" and are supported against centrifugal forces by high strength steel retaining rings. The section of the rotor shaft forging which is disposed underneath the rotor end windings is referred to as the spindle. For ease of reference and explanation hereinbelow, the rotor winding can be characterized has having a slot end region within the radial slots at the end of the rotor body, and a rotor end winding region that extends beyond the pole face, radially spaced from the rotor spindle. This invention relates primarily to the cooling of the rotor end winding region of the rotor winding.

The rotor coils are disposed in the radial slots of the rotor body for carrying current. At the end winding region, the end turns are suitably connected to form the required current pattern. Because the rotor winding gives rise to resistive heating, certain dynamoelectric machines require additional cooling at the rotor end windings. However, these regions are difficult to cool effectively. In that regard, heat is difficult to remove because the mechanical structure that supports the end winding under high centrifugal loads inhibits the placement of cooling passages, lest the mechanical integrity of the support system be compromised.

Several rotor end winding cooling approaches have been used in the past. One technique for avoiding excessive temperature in the end turns and conductor slot bars includes employing a longitudinal gas groove formed on the surface of the conductor coil to provide a ventilation gas channel. The groove is closed by an adjacent coil and its insulation to retain the gas for flow along the entire length of the channel. Cooling gas enters the field turns from an open cavity via inlet ports at the sides of the turns and then flows longitudinally along the grooves to discharge locations that are typically either radial chimneys in the rotor body or discrete baffled discharge zones under and around the end winding. The gas in these baffled zones is typically discharged either to the air gap (i.e., the gap between the rotor and stator) via machined slots in the pole face, or to the area outside of the centering ring via openings in the centering ring. Some schemes utilize discharges through radial holes in the retaining rings. Some cooling approaches are proposed by Kazmierczak (U.S. Pat. Nos. 6,252,318; 6,204,580; 5,281,877), Kaminski (U.S. Pat. Nos. 6,339,268; 4,709,177), and Staub (U.S. Pat. No. 5,644,179). However, these disclosures ultimately deal with how to effectively design a ventilation circuit for end windings, for instance how to arrange grooves (with different patterns lengths, and the like) to achieve relatively uniform temperature distribution.

SUMMARY OF INVENTION

As will be understood, the use of ventilation grooves in conductor coils greatly reduces the effective cross-sectional area for current transfer, leading to high current density and accordingly high electrical resistance. Thus, it would be desirable to minimize cooling groove dimensions while satisfying end winding cooling requirements. In an embodiment of the invention, groove dimension is minimized while satisfying end winding cooling requirements by adopting heat transfer enhancement techniques to maximize the heat transfer effect while maximizing the cross-sectional area for a current transfer.

Enhanced heat transfer may be realized by providing a cooling gas passage that has a knurled surface. Such roughness geometries act as vortex generators to increase the rate of heat transfer. Thus, the invention may be embodied in a cooling gas ventilation circuit for an end winding of a rotary machine having a rotor, a plurality of radial slots provided in the rotor, and a plurality of coils respectively seated in the radial slots, the coils each comprising a plurality of radially stacked turns, the coils extending beyond a pole face of the rotor to form an end winding, cavities being defined between adjacent pairs of coils, the ventilation circuit comprising: a cooling gas passage defined in at least one turn of each coil of the end winding, the cooling gas passage extending from an inlet port in communication with the cavity on one longitudinal side of the turn to one of (1) a radial chimney defined through a plurality of the turns of the coil within the respective radial slot and (2) an exit port defined on the other longitudinal side of the turn, the cooling gas passage extending along at least a portion of the longitudinal extent of the turn; and wherein at least a portion of a surface of the cooling gas passage is knurled so as to have a non-planar surface profile for enhanced heat transfer.

In addition or in the alternative, enhanced heat transfer may be realized by providing a cooling gas passage that undulates along its length. With such a passage configuration, the cooling flow changes flow direction periodically along the conductor causing local flow separation and reattachment with the passage side surface. Such disturbances between the flow and walls reduces boundary layer thickness and, as a result, increases surface heat transfer coefficient. Thus, the invention may also be embodied in a cooling gas ventilation circuit for an end winding of a rotary machine having a rotor, a plurality of radial slots provided in the rotor, and a plurality of coils respectively seated in the radial slots, the coils each comprising a plurality of radially stacked turns, the coils extending beyond a pole face of the rotor to form an end winding, cavities being defined between adjacent pairs of coils, the ventilation circuit comprising: a cooling gas passage defined in at least one turn of each coil of the end winding, the cooling gas passage extending from an inlet port in communication with the cavity on one longitudinal side of the turn to one of (1) a radial chimney defined through a plurality of the turns of the coil within the respective radial slot and (2) an exit port defined on the other longitudinal side of the turn, the cooling gas passage extending along at least a portion of the longitudinal extent of the turn; and wherein at least a portion of the cooling gas passage defines a wavy cooling path along a direction of cooling gas flow for enhanced heat transfer.

In order to maximize the heat transfer enhancement effect, it is possible to combine these two techniques, that is provide wavy grooves with knurled surfaces. Thus the invention may further be embodied in a rotary machine comprising a rotor, a plurality of radial slots provided in the rotor, a plurality of coils respectively seated in the radial slots, the coils each comprising a plurality of radially stacked turns, the coils extending beyond a pole face of the rotor to form an end winding, cavities being defined between adjacent pairs of coils, and a cooling gas passage defined in at least one turn of each coil of the end winding, the cooling gas passage extending from an inlet port in communication with the cavity on one longitudinal side of the turn to one of (1) a radial chimney defined through a plurality of the turns of the coil within the respective radial slot and (2) an exit port defined on the other longitudinal side of the turn, the cooling gas passage extending along at least a portion of the longitudinal extent of the turn; wherein at least a portion of a surface of the cooling gas passage is knurled to define at least one of ribs and dimples for enhanced heat transfer, and wherein at least a portion of the cooling gas passage defines an undulating path for enhanced heat transfer.

BRIEF DESCRIPTION OF DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION

Figure 1:
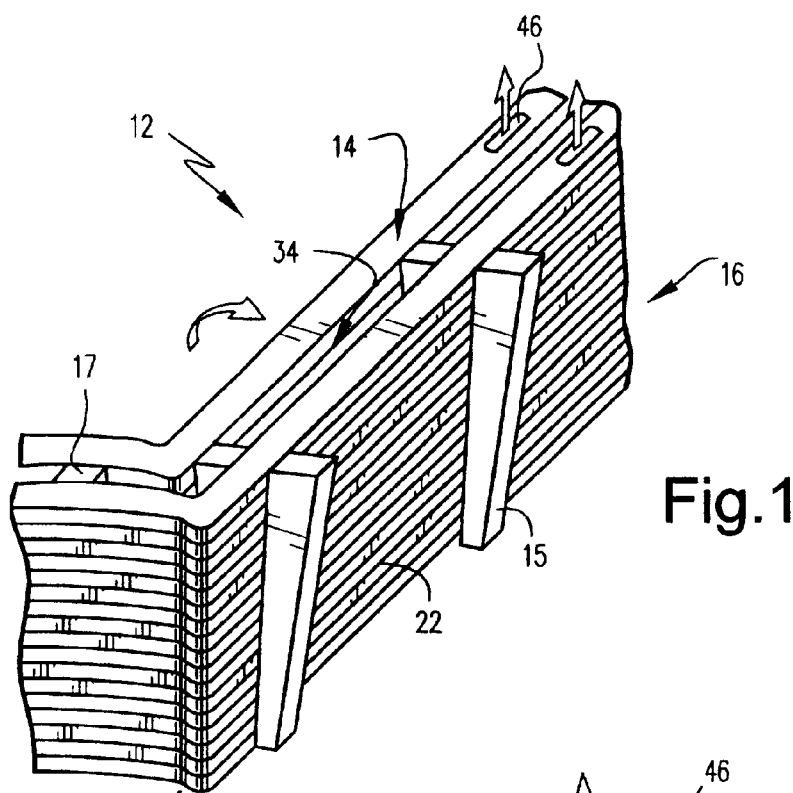
FIG. 1 is a partial, schematic, perspective view of a part of a rotor end winding assembly.
Figure 2:
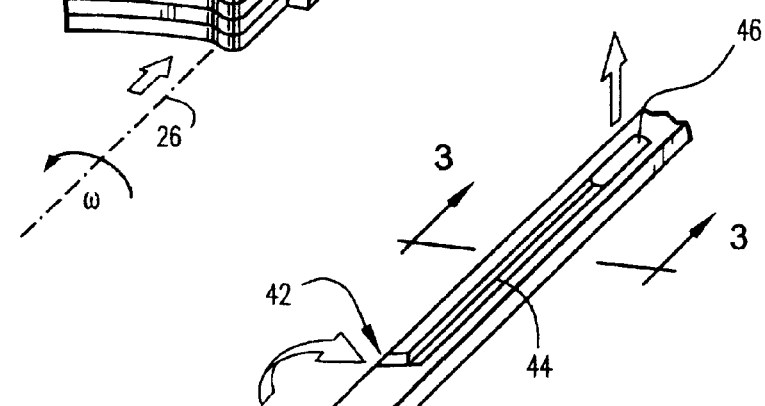
FIG. 2 is a schematic perspective view showing a single copper conductor having a short cooling groove.
Figure 3:
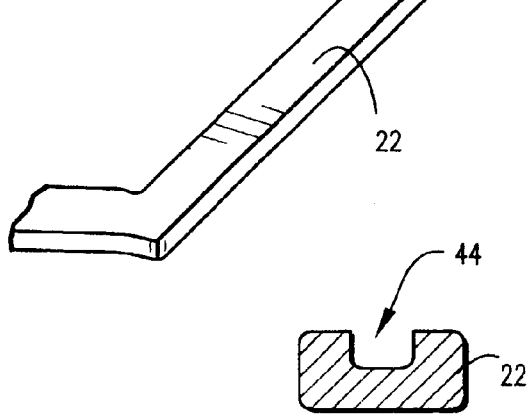
FIG. 3 is a cross-sectional view taken along line 3—3 of FIG. 2.

An example of an endwinding cooling circuit providing ventilation flow through short grooves is depicted in FIGS. 1–3. In this assembly, the rotor winding 12 is comprised of a number of coils 14, 16, separated by wedge blocks 15 along the rotor axis 26 and space blocks 17 at the front or end of the end winding. Thus, a number of rotor inter-coil cavities 34 are formed between adjacent coils and wedge blocks or space blocks. Each coil 14, 16 is defined by many field turns 22 of copper conductors with insulation (not shown) between adjacent turns.

In the configuration shown in FIGS. 1–3, in each turn, there is a short groove 44 which starts adjacent the wedge block 15 at an inlet port 42 that extends at an angle of about 45° to the conductor axial center line and then becomes parallel to the conductor, eventually terminating at a radial cooling chimney 46. This cooling arrangement brings the cooling gas into direct contact with conductors 22. More specifically, cooling gas from the environment enters into the subslot cavity, which is beneath the end winding, fills the inter-coil rotor cavities 34, distributes via ports 42 into the grooves 44 and then discharges into the radial chimneys 46 and exhausts to the rotor-stator air gap (not illustrated).

Figure 4:
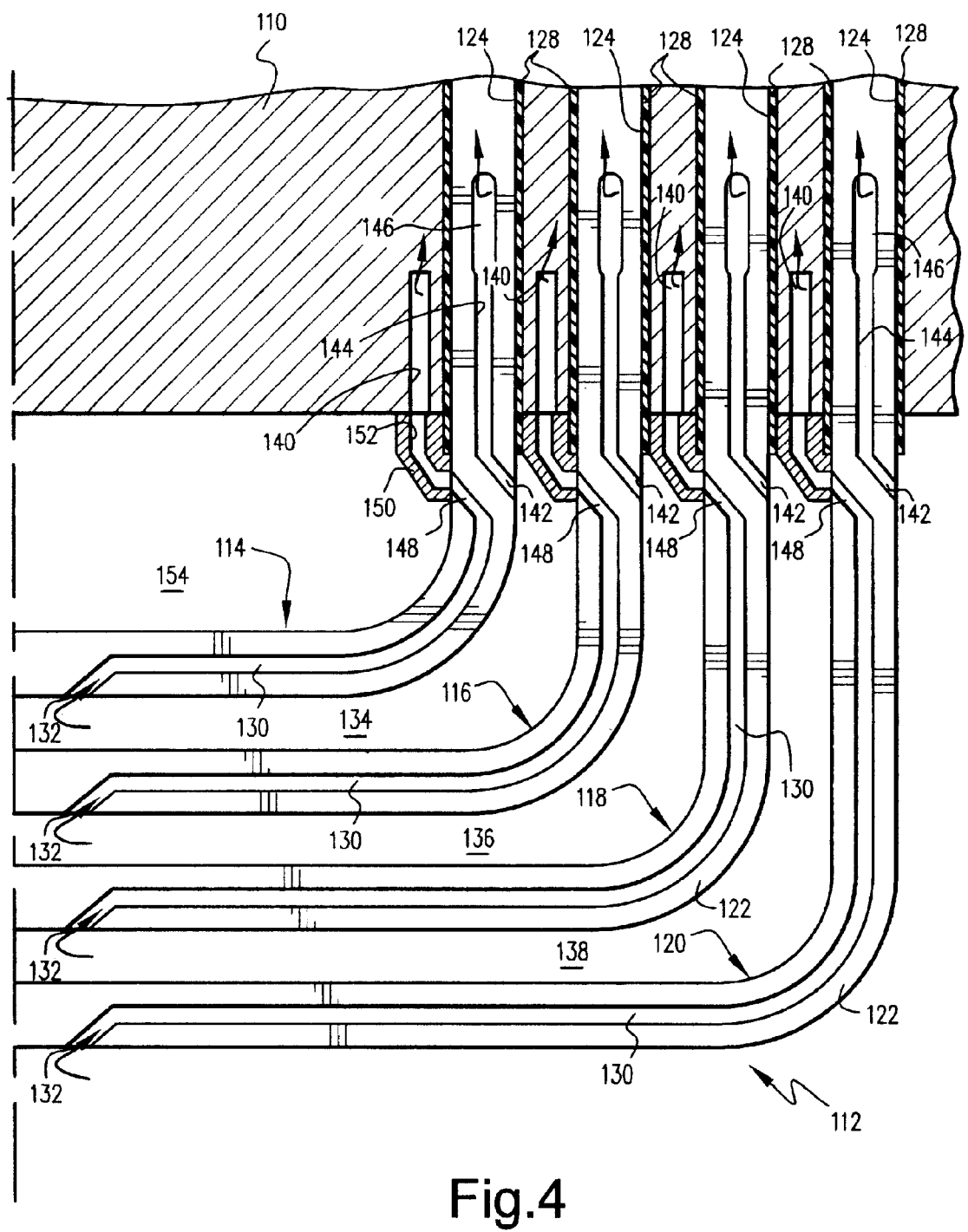
FIG. 4 is a partial schematic, sectional view of another exemplary rotor end winding assembly.

With reference to FIG. 4, another example of an end-winding cooling groove configuration is illustrated. This cooling gas ventilation circuit is the subject of U.S. Pat. No. 6,339,268, the entire disclosure of which is incorporated herein by this reference. In FIG. 4, one end of a rotor body 110 is illustrated with a rotor end winding 112 extending beyond one end of the rotor body. The rotor end winding includes the end regions of a number of complete coils 114, 116, 118 and 120 in a concentric, generally rectangular configuration. Each coil includes many field turns 122 of copper conductors in a stacked configuration. These coils are nested within the radial slots 124 machined into the outer periphery of the rotor body, with the end windings extending axially beyond the rotor body at both ends of the machine in a conventional fashion. A spindle portion of the rotor (not shown) extends in an axial direction, radially inward of the end winding. The coils 114, 116, 118 and 120 are supported in the slots 124 of the rotor body against centrifugal forces by metallic wedges (not shown) which bear against machined dovetail surfaces (not shown) in each rotor coil slot. The rotor winding is electrically insulated from the rotor body via appropriate slot armor 128. In addition, the turns which make up the coils of the rotor winding are electrically insulated from each other via appropriate turn-to-turn insulation (not shown). In the illustration of FIG. 4, the wedge blocks and spacer blocks that are normally present in the end winding to separate the coils 114, 116, 118 and 120 have been omitted for clarity.

As in the configuration of FIG. 1, at least one cooling gas passage is formed to extend along at least a portion of the length of at least one turn of at least one coil of the end winding. In the exemplary embodiment illustrated in FIG. 4, plural cooling gas passages are provided to extend along the turn(s). More specifically, in the configuration of FIG. 4, the cooling gas passages are comprised of first cooling gas passages defined by grooves 130 machined on the upper and/or lower radial face of some or all of the turns to allow cooling gas to enter respective ports 132 on one longitudinal side of the turns and to exit into the cavities 134, 136, and 138 between the coils 114 and 116, 116 and 118, and 118 and 120, respectively, on the other longitudinal side of the turns.

To encourage flow through and along the respective grooves, it can be seen that the inlet ports are inclined with respect to the exposed longitudinal side face of the turns, in this case also corresponding to the axial end face of the assembly. It is to be understood, however, that as an alternative to an inclined port, one or more of the inlet ports could be disposed perpendicular to the direction in which the groove 130 extends. In the illustrated embodiment a single groove extends along each half end winding to discharge through discharge port 148. Again, to facilitate un-impeded flow, the exit or discharge port 148 is preferably inclined with respect to the side face of the respective copper turn. In the alternative, one or more of the exit ports may be disposed perpendicular to the side face of the turn. In the absence of flow directing structure, discussed below, the exit ports will discharge the end winding ventilating gas into the cavities intermediate the coils. As described above, slots or holes 140 are defined in the rotor teeth for directing the end winding gas, e.g., to the gap between the rotor and the stator (not shown). To ensure that the coil end winding ventilating gas flows substantially directly to and into the ventilating slot(s) in the respective rotor tooth, ventilated body blocks 150 may be provided to intercept flow from the exit ports 148 of the copper turns. Thus, each ventilated block 150 acts as a manifold having a passage 152 for intercepting and directing this flow to the slots or holes 140 in the rotor teeth.

Some or all of the turns in coils 114, 116, 118 and 120 also have second cooling gas passages defined by longitudinal grooves 144 extending from holes or ports 142 to radial chimneys 146 within the rotor body 110 that are formed, e.g., by punching the turns 122. As can be seen, cooling gas grooves 144 are longitudinally offset from grooves 130, so that they act to cool respective portions of the turn(s).

The embodiment of FIG. 4 shows all of the ports 148 coming from the right hand side, to open at the left face of the turns. As an alternative, these ports can all be defined as coming from the left hand side. With this alternate configuration, the cavity 154 at the rotor pole body would be vented via the ports to the chimney 146 of coil 114, and there would be no need for a ventilation slot in the rotor pole. It is to be understood that other variations of blocking patterns can be adapted from this basic concept.

The turns of the coils in some rotors are formed from multiple layers. In such structures, cooling gas passages for the purposes described herein may be defined by grooves in the upper and/or lower radial faces of one or more of the layers of one or more of the turns. Thus, while in the illustrated embodiments the end winding cooling passages 44,130,144 are all defined in the upper radial face of each turn of each coil, it is to be understood that these passages or grooves may be defined in either the upper or the lower face of the turn, or one in the upper face and one in the lower face of one or more turns. Furthermore, these grooves could be defined in alternating turns so that every other turn has a groove 130 and the remaining turns have a groove 44,144. Other cooling passage configurations and combinations in which the invention as described hereinbelow may be used will be apparent to the skilled artisan from the foregoing examples in conjunction with the following disclosure.

As noted above, the use of ventilation grooves 44, 130, 144 in conductor coils greatly reduces the effective cross-sectional area for current transfer, leading to high current density and accordingly high electrical resistance. Thus, it would be desirable to minimize cooling groove dimensions while satisfying end winding cooling requirements. In an embodiment of the invention, groove dimension is minimized while satisfying end winding cooling requirements by adopting heat transfer enhancement techniques to maximize the heat transfer effect while maximizing the cross-sectional area for a current transfer.

Figures 5, 6:
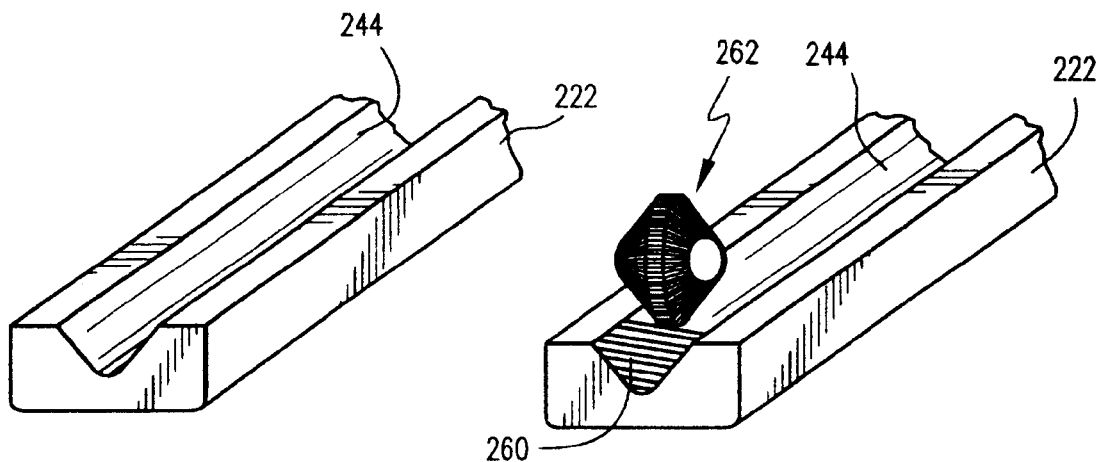
FIG. 5 is a schematic illustration of a first step of forming an enhanced heat transfer groove wherein a V-shaped groove has been machined in a conductor.
FIG. 6 is a schematic perspective view showing a step of knurling on the groove surface for enhanced heat transfer.
Figures 7, 8, 9:
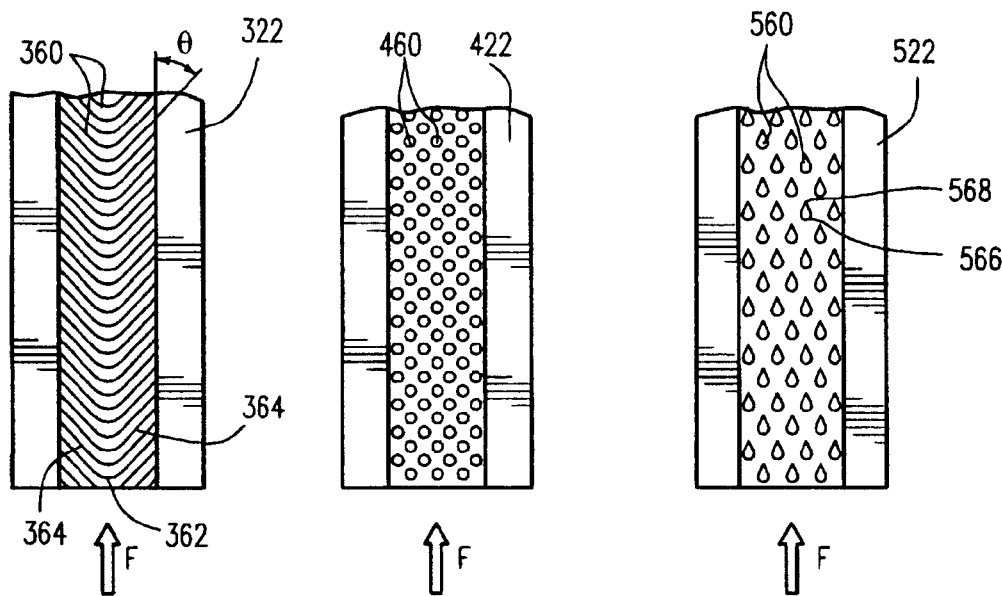
FIG. 7 is a schematic plan view of a heat transfer enhancing groove having V-shaped ribs.
FIG. 8 is a schematic plan view of a heat transfer enhancing groove surface having hemispherical dimples.
FIG. 9 is a schematic plan view of a heat transfer enhancing groove surface having tear-drop shaped dimples.

Thus, in an embodiment of the invention, surface manifestations are provided on one or more of the cooling gas grooves for heat transfer enhancement. More specifically, in an embodiment of the invention, the cooling groove is formed as a V-shaped groove 244 that is machined longitudinally on the surface of a copper conductor 222 as illustrated in FIG. 5. Surface manifestations 260 are then defined by knurling the surface of the groove for enhanced heat transfer effects. In an exemplary embodiment, as illustrated in FIG. 6, a knurling tool 262 is used to form ribs or dimples on the groove surface. These roughness geometries act as vortex generators to increase the rate of heat transfer. By way of example, three roughness patterns are shown in FIGS. 7–9, including V-shaped transverse ribs 360, hemispherical dimples 460, and teardrop-shaped dimples 560. Although in the exemplary embodiments of FIGS. 7–9, the groove may be V-shaped as shown in FIGS. 5–6. In the alternative the channel may be defined as a truncated (flat-bottomed) V-shape, as a square) FIG. 3), or as a semi-circle, for example.

Referring more particularly to the configuration shown in FIG. 7, experimentation has shown that enhanced heat transfer is strongly affected by the ratio of rib spacing to rib height L/E where L is the distance between two ribs and E is the height of the rib. Nine rib configurations in a square channel were tested and the results showed that the highest heat transfer enhancement is provided by a V-rib configuration 360 in the groove of the conductor 322 and oriented with respect to flow direction F as shown in FIG. 7. As illustrated, the V-rib configuration has an apex 362 and first and second legs 364, each leg 364 being defined at an angle θ with respect to cooling gas flow direction F. The enhanced heat transfer ratio ranges from 2–3.5 depending on the angle θ, rib height and similar such conditions. The rib angle θ is preferably in the range of about 45°–90° where θ equals 90 refers to straight ribs that are transverse to the direction of flow F.

Concavity surfaces as depicted in FIGS. 8 and 9 exhibit drag reduction characteristics and heat transfer enhancement. Experimentation has shown that both hemispherically shaped dimples 460 as schematically shown in conductor 422 (FIG. 8) and teardrop-shaped dimples 560 as depicted in conductor 522 (FIG. 9) can increase the heat transfer rate by 2.2 to 2.5 times that of a smooth plate. While this enhancement is similar to that provided by other surface manifestations, such as ribs 360, the pressure drop is less by a factor of 2 to 3. It is to be noted that in the embodiment illustrated in FIG. 9, the teardrop shaped dimples 560 have a rounded end 566 and a generally pointed end 568, the generally pointed end 568 being the downstream end of the dimple with respect to the flow direction F of cooling air.

Figure 10:
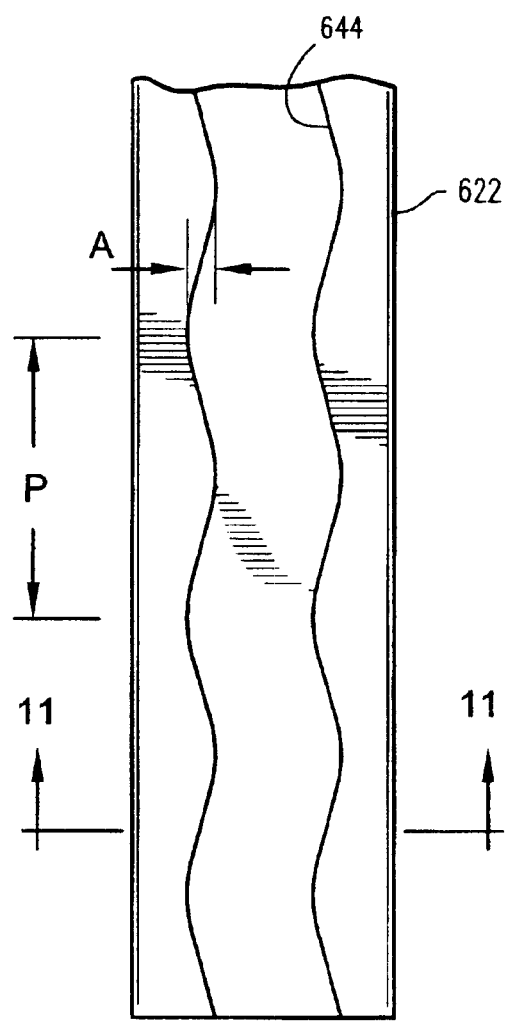
FIG. 10 is a schematic plan view showing an undulating ventilation groove.
Figure 11:
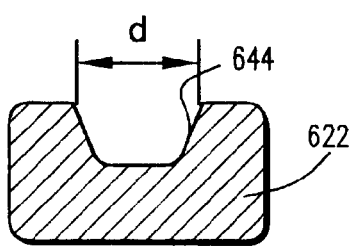
FIG. 11 is a cross-sectional view showing groove shape at line 11—11 of FIG. 10.

According to a further embodiment of the invention, heat transfer enhancement may be provided by forming the groove(s) in the conductor(s) 622 so as to have undulating sides to define wavy groove(s) 644. As will be understood, with such a groove configuration, the ventilation flow changes flow direction periodically along the groove causing local flow separation and reattachment with the groove side surface. Such disturbances between the flow and walls reduces boundary layer thickness and, as a result, increases surface heat transfer coefficient. In addition, the redeveloping boundary layer from the reattachment point also contributes to heat transfer enhancement. With wavy flow channels as schematically illustrated in FIG. 10, the Nusselt number enhancement ratio may be 2.3 to 3.2. As shown in FIG. 11, in the illustrated embodiment, the wavy groove 644 has a flat bottom. However, the groove may be V-shaped in cross-section (FIG. 5) or semi-circular in cross-section. As seen from FIGS. 10 and 11, irrespective of the groove shape, the groove has a constant width d.

A simple type of wavy groove may be defined by utilizing a sinusoidal function for the longitudinal profile, which can be expressed as $y = A \sin(\omega z)$, where A is the height of the profile with respect to the axis and ω is the angular frequency, both A and ω are user selectable parameters. Therefore, the wavy groove pitch is given as p=2 π/ω. It should be appreciated that the aforementioned amplitude parameter A, and angular frequency parameter ω can be optimized accordingly by one skilled in the art for the characteristics of the rotor end winding. The present invention is not limited to a sine function as illustrated, but other functions, such as a cosine function or an equation involving sine and cosine or equivalents thereof, may be employed.

In order to maximize the heat transfer enhancement effect, the two-above described techniques may be combined, i.e., using wavy grooves with knurled surfaces. In such a way, the surface heat transfer coefficient may increased several times as compared to the conventional smooth, straight groove surfaces. Consequently, the cross-sectional area of the ventilation grooves in the end windings can be greatly reduced.

As will be understood from the forgoing, the heat transfer enhancement surface manifestations and/or groove shapes of the invention may be adopted in and/or as the cooling grooves depicted in the cooling groove configurations of FIGS. 1–2 and/or 4 and indeed any known ventilation circuit for endwindings irrespective of the combination and length of cooling grooves. Providing surface manifestations and/or a groove shaped as disclosed herein enhances the heat transfer that may be achieved with the cooling groove such that the dimensions of the cooling groove may be reduced while achieving the desired level of cooling. Providing grooves having lesser dimensions will minimize the reduction and effective cross-sectional area of the coils for current transfer. Thereby, minimizing the problems of high current density and accordingly high electrical resistance. Thus, with surface manifestations and/or groove shapes as disclosed herein, the cooling groove dimensions may be minimized while satisfying endwinding cooling requirements. The above described ventilation schemes can be employed on any machine with a concentric wound field winding of suitable turn dimensions with square corner and/or C-shaped corner construction, and can most readily be applied to two pole and four pole round rotor turbine driven generators. The cooling gas can be any suitable gas but is most typically air or hydrogen.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling gas ventilation circuit for an end winding of a rotary machine having a rotor, a plurality of radial slots provided in said rotor, and a plurality of coils respectively seated in said radial slots, said coils each comprising a plurality of radially stacked turns, said coils extending beyond a pole face of the rotor to form an end winding, cavities being defined between adjacent pairs of said coils, said ventilation circuit comprising:

a cooling gas passage defined in at least one turn of each said coil of said end winding, said cooling gas passage extending from an inlet port in communication with the cavity on one longitudinal side of said turn to one of (1) a radial chimney defined through a plurality of the turns of the coil within said respective radial slot and (2) an exit port defined on the other longitudinal side of said turn, said cooling gas passage extending along at least a portion of the longitudinal extent of said turn; and wherein at least a portion of a surface of said cooling gas passage is knurled so as to have a non-planar surface profile for enhanced heat transfer.

2. A cooling gas ventilation circuit according to claim 1, wherein said passage comprises a groove that is generally V-shaped in vertical cross-section.

3. A cooling gas ventilation circuit according to claim 1, wherein said knurled surface comprises a plurality of ribs.

4. A cooling gas ventilation circuit according to claim 3, wherein said ribs are generally V-shaped having an apex and first and second legs, each said leg being defined at an angle with respect to a cooling gas flow direction.

5. A cooling gas ventilation circuit according to claim 4, wherein said angle is between about 45° and 90°.

6. A cooling gas ventilation circuit according to claim 1, wherein said knurled surface comprises a dimpled surface.

7. A cooling gas ventilation circuit according to claim 6, wherein said dimples are substantially hemispherically shaped.

8. A cooling gas ventilation circuit according to claim 6, wherein said dimples are teardrop shaped, having a rounded end and a pointed end, said pointed end being the downstream end of the dimple with respect to a flow direction of said cooling air.

9. A cooling gas ventilation circuit according to claim 1, wherein said passage is non-linearly disposed along said turn of said coil.

10. A cooling gas ventilation circuit according to claim 9, wherein said passage defines a wavy cooling path along a direction of cooling gas flow.

11. A cooling gas ventilation circuit according to claim 10, wherein walls of said passage are sine wave shaped.

12. A cooling gas ventilation circuit according to claim 11, wherein said wave shaped walls define a groove of substantially constant width.

13. The cooling gas ventilation circuit of claim 1, wherein said inlet port of said cooling passage is inclined to the respective turn longitudinal side face.

14. The cooling gas ventilation circuit of claim 1, wherein said cooling passage comprises a groove defined in a radially facing surface of said turn.

15. The cooling gas ventilation circuit of claim 14, wherein said groove is defined in the radially upper face of said turn.

16. A cooling gas ventilation circuit for an end winding of a rotary machine having a rotor, a plurality of radial slots provided in said rotor, and a plurality of coils respectively seated in said radial slots, said coils each comprising a plurality of radially stacked turns, said coils extending beyond a pole face of the rotor to form an end winding, cavities being defined between adjacent pairs of said coils, said ventilation circuit comprising:

a cooling gas passage defined in at least one turn of each said coil of said end winding, said cooling gas passage extending from an inlet port in communication with the cavity on one longitudinal side of said turn to one of (1) a radial chimney defined through a plurality of the turns of the coil within said respective radial slot and (2) an exit port defined on the other longitudinal side of said turn, said cooling gas passage extending along at least a portion of the longitudinal extent of said turn; and wherein at least a portion of said cooling gas passage defines a wavy cooling path along a direction of cooling gas flow for enhanced heat transfer.

17. A cooling gas ventilation circuit according to claim 16, wherein walls of said portion of said passage are sine wave shaped.

18. A cooling gas ventilation circuit according to claim 16, wherein walls of said wavy cooling path are of substantially constant width.

19. A cooling gas ventilation circuit according to claim 16, wherein at least a portion of a surface of said cooling gas passage is knurled so as to define a plurality of ribs for enhanced heat transfer.

20. A cooling gas ventilation circuit according to claim 19, wherein said ribs are generally V-shaped having an apex and first and second legs, said legs being disposed downstream of said apex with respect to a cooling gas flow direction and being disposed at an angle with respect to a cooling gas flow direction.

21. A cooling gas ventilation circuit according to claim 20, wherein said angle is between about 45° and 90°.

22. A cooling gas ventilation circuit according to claim 16, wherein at least a portion of a surface of said cooling gas passage knurled so as to define a plurality of dimples for enhanced heat transfer.

23. A cooling gas ventilation circuit according to claim 22, wherein said dimples are substantially hemispherically shaped.

24. A cooling gas ventilation circuit according to claim 22, wherein said dimples are teardrop shaped having a rounded end and a pointed end, said pointed end being the downstream end of the dimple with respect to a flow direction of said cooling air.

25. The cooling gas ventilation circuit of claim 16, wherein said cooling passage comprises a groove defined in a radially upper surface of said turn.

26. A rotary machine comprising a rotor, a plurality of radial slots provided in said rotor, a plurality of coils respectively seated in said radial slots, said coils each comprising a plurality of radially stacked turns, said coils extending beyond a pole face of the rotor to form an end winding, cavities being defined between adjacent pairs of said coils, and a cooling gas passage defined in at least one turn of each said coil of said end winding, said cooling gas passage extending from an inlet port in communication with the cavity on one longitudinal side of said turn to one of (1) a radial chimney defined through a plurality of the turns of the coil within said respective radial slot and (2) an exit port defined on the other longitudinal side of said turn, said cooling gas passage extending along at least a portion of the longitudinal extent of said turn;

wherein at least a portion of a surface of said cooling gas passage is knurled to define at least one of ribs and dimples for enhanced heat transfer, and wherein at least a portion of said cooling gas passage defines an undulating path for coolant flow for enhanced heat transfer.

* * * * *